Dec. 31, 1935. R. W. KEITH 2,026,179
FUEL CALORIMETER AND PROCESS
Original Filed Aug. 26, 1930  2 Sheets-Sheet 1
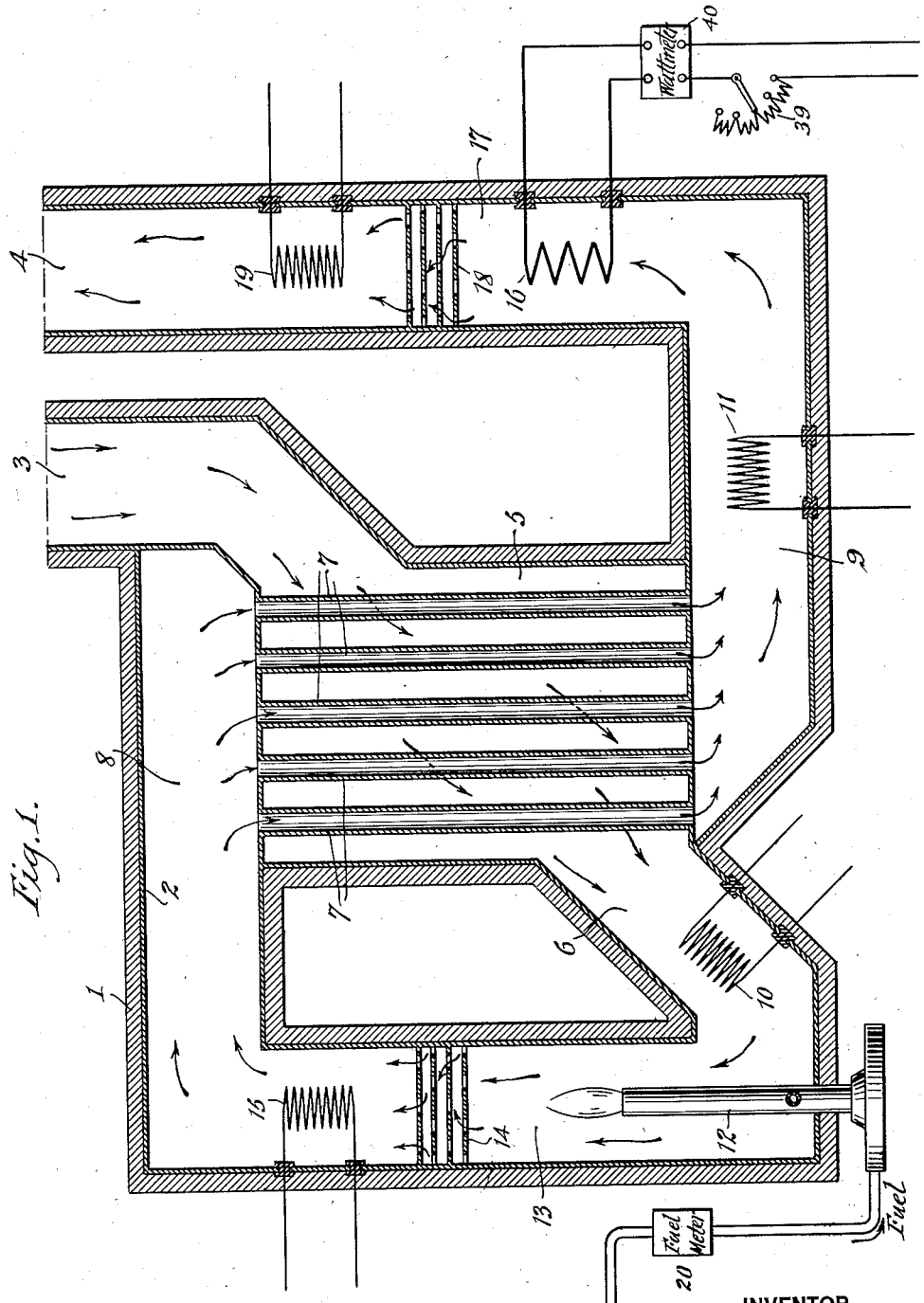
INVENTOR
*Rafael W. Keith*
BY *Munn&Co.*
ATTORNEY
WITNESSES
*Edw. Thorpe*
*A. L. Kitchin.*

Dec. 31, 1935.　　　　　R. W. KEITH　　　　　2,026,179
FUEL CALORIMETER AND PROCESS
Original Filed Aug. 26, 1930　　2 Sheets-Sheet 2
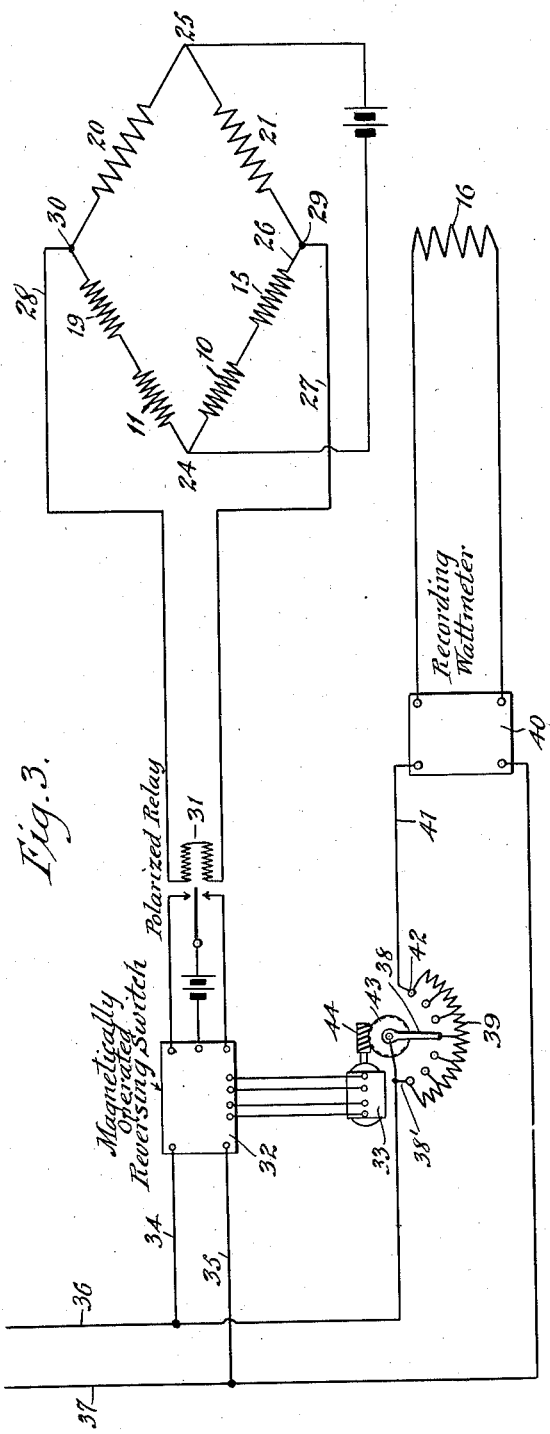
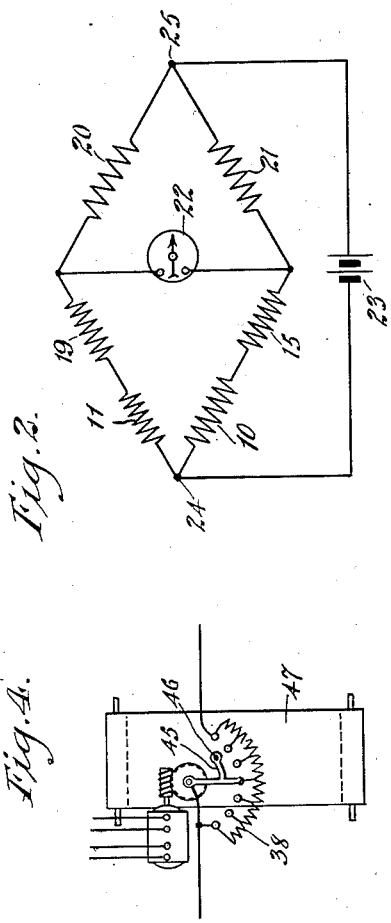
INVENTOR
Rafael W. Keith
BY
ATTORNEY
WITNESSES Patented Dec. 31, 1935

2,026,179

UNITED STATES PATENT OFFICE 2,026,179

FUEL CALORIMETER AND PROCESS

Rafael William Keith, Caroline, N. Y.

Application August 26, 1930, Serial No. 477,888
Renewed November 28, 1933

16 Claims. (Cl. 73—184)

This invention relates to an improved fuel calorimeter, and has for its object to provide an improved instrument to determine the heating value of fuels, particularly liquids or gaseous fuels.

Another object of the present invention is to provide an instrument which is accurate and in which the accuracy can be easily checked.

An additional object of the invention is to provide an instrument whose indication is dependent only on the heat value of the fuel.

A further additional object is to provide an instrument whose indication is unaffected by ordinary changes in atmospheric conditions, such as changes in temperature, pressure and relative humidity.

A still further additional object of the invention is to provide an instrument which will be fully automatic and which will present either a visual indication or a record on a moving strip of paper or other article.

In the accompanying drawings—

Figure 1 is a longitudinal vertical sectional view through the principal part of a fuel calorimeter embodying the invention;

Figure 2 is a diagram illustrating the operation of the structure shown in Figure 1;

Figure 3 is a diagram showing an embodiment of the invention including an automatic control.

Figure 4 is a fragmentary view showing a modified structure to that illustrated in Figure 3 and illustrating how the structure shown in Figure 3 might present a permanent record on a moving tape.

Referring to the accompanying drawings by numerals, I indicates a housing which is substantially of insulating material, and arranged inside of this housing is a lining 2 preferably of metal or other heat resisting material of some kind. The structure shown in Figure 1 is intended to circulate air and gas in a manner hereinafter described and to utilize a known energy for producing heat and utilizes gas or liquid fuel having an unknown heat value. As indicated by the arrows, air at atmospheric temperature is permitted to enter the passageway 3 and eventually exhaust out through the passageway 4. When the device is in full operation the air will usually automatically circulate, but in starting the device, and sometimes in operating it, it may be necessary to use a fan to force air into the passageway 3 under a given pressure, which is preferably very slight and only sufficient to cause air to flow substantially evenly throughout the device.

Air entering passageway 3 will pass through the heat exchange chamber 5 and into the primary air entrance section or passageway 6. The heat exchange chamber 5 is provided with a number of tubular members 7 preferably of metal and extending entirely through chamber 5 so as to receive the air and products of combustion from chamber 8 and discharge the same into chamber 9. In this way the gaseous matter passing through the tubes 7 will become cooled while at the same time air passing into the passageway 6 will be warmed. Preferably the device is so designed that the air or gaseous matter in passageway 6 will be of substantially the same temperature as the air or gaseous matter in the secondary air entrance section or passageway 9, or at least it will be of substantially the same temperature at the respective entrance resistances 10 and 11. The air in the passageway 6 will move past the burner 12 into the passageway 13 and be heated by the heat produced by the burner 12.

A number of foraminous plates 14 are arranged in the passageway 13, the holes in the various plates being staggered so as to prevent radiant heat reaching the resistance 15, and also to cause the gases to mix as much as possible. From the chamber 8 the gaseous matter flows through pipes 7 into the secondary entrance section 9 and slightly heats resistance 11. The air and gases passing from resistance 11 will encounter the heating element 16 arranged in the secondary heating chamber 17. This heating element may be of any preferred kind for dissipating heat at a known rate and transmitting a known amount of heat to the flowing gases. Electricity is a form of energy that can be readily measured, and as electricity can be easily transformed into heat, an electric heater has been shown as a desirable heating element. As the gaseous matter passes the heater 16 it will be heated but the foraminous baffles 18 will prevent radiant heat reaching resistance 19 while allowing the heated gases to freely pass.

The baffles 14 and 18 are intended to prevent any direct heat from the respective burners or heaters reaching resistances 15 and 19 so that the resistances 15 and 19 will be only affected by the temperature of the gas.

As the air passes through the heat exchange chamber 5 it is heated, and as the air and gases (products of combustion) pass through the tubes 7 they are cooled so that air or gaseous matter striking the resistances 10 or 11 will heat the same to substantially the same temperature. It will be evident that in the heat exchange chamber the tubes 7 and associated parts may be proportioned so that this result will be secured with reasonable accuracy. This arrangement is provided in order to make the average temperature of 11 and 19 equal, or nearly equal to the average temperature of 10 and 15 when the difference in temperature between 11 and 19 is equal to the difference in temperature between 10 and 15.

It will be noted that in order that the heat supplied by the heating element 16 in unit time be the same as the heat supplied by burner 12 in unit time, the difference in temperature between resistances 10 and 15 must be equal to the difference in temperature between resistances 11 and 19. Also the same weight of gaseous matter must pass chambers 13 and 17 in unit time and the average temperature between 10 and 15 must be nearly equal to the average temperature between 11 and 19.

In order to more specifically set forth the operation of the instrument a specific example is given below, but it will be understood that this is only one example in order to show the functioning of the device, and the device is, of course, not limited in any way to the temperature set forth.

For the present example it is to be assumed that the air entering at 3 is at 70° F. and going through chamber 5 the entering air is heated to, say, 120° F. so that the resistance 10 is at 120° F. In chamber 13 combustion takes place by reason of the action of burner 12 and the air and products of combustion are heated, for instance, to 175° F. so that the resistance 15 is at a temperature of 175° F. The difference of temperature produced by the burning fuel is then the difference between the temperature of resistance 15 and the temperature of resistance 10, namely, 175° minus 120°=55° F. From the primary heating chamber 8 the air and products of combustion go through the inside of the tubes 7 of the heat exchange device whereby they are cooled to, say, 125° F. As the air and products of combustion pass resistance 11 at this temperature it naturally causes the temperature of resistance 11 to be of 125° F. This temperature is nearly equal to the temperature of resistance 10. The temperature of resistances 10 and 11 can be identical, or they can be slightly different as just mentioned, or they can be widely different, although preferably they are near the same, as just mentioned. After the air and products of combustion pass resistance 11 they go through chamber 17 where the secondary source of heat 16 is located. If the electric heater or secondary source of heat 16 heats the air and products of combustion to 180° F. then the increase in temperature produced by the heater 16 is 180° minus 125°=55° F. which is the same as the difference in temperature produced by the burning fuel.

Therefore the average temperature between resistance 15 and resistance 10 is 147.5° F. or ½ (175° plus 120° F.). This is very nearly the same as the average temperature between resistance 19 and resistance 11, namely, 152.5° F. or ½ (180° plus 125° F.). It will thus be noted that the average specific heat of the air and products of combustion flowing through the primary heating chamber is (with negligible error) numerically equal to the average specific heat of the air and products of combustion flowing through the secondary heating chambers.

The same weight of gases circulates in a given time through chambers 13 and 17 and their average specific heats are substantially the same, and the rise of temperature produced by the burning fuel in chamber 13 is numerically equal to the rise in temperature produced by the heater 16, consequently the heat added to the flowing gases by the burning fuel is numerically equal to the heat added to the flowing gases by the heater during the same time interval. Knowing the rate at which fuel is being supplied to the burner and the rate at which electrical energy is supplied to the heater, the heating value of the fuel can be readily computed. For example: If during the run the current used by the heater 16 has a heat equivalent of 1000 B. t. u. and if for the same time one pound of fuel has been used in the burner 12 it will be evident that the fuel has a heating value of 1000 B. t. u. per pound.

When it is desired to use the instrument in practical work the burner is lighted and then the power input to the heating element 16 is adjusted until the difference in temperature between the resistances 19 and 11 is numerically equal to the difference in temperature between resistance 15 and resistance 10. When this occurs the bridge illustrated in Figure 2 becomes balanced and the galvanometer needle swings to zero. It will, therefore, be seen that the bridge determines the point when these two differences in temperature are equal, regardless of the actual numerical magnitude of these differences.

In order to secure an accurate reading the operator should know when the temperature differences 15—10=19—11. In order to visually disclose this the resistances are connected up as two legs of a Wheatstone bridge, as shown in Figure 2.

With regard to the various resistances 10, 11, 15 and 19 it is to be noted that they are preferably in the form of coils and are made of resisting material whose resistance varies proportionately to the absolute temperature. A good material for this use would be platinum, although other materials either alone or in combination may be used without departing from the spirit of the invention. When made of this material it can be seen that the four resistances 10, 15, 11, 19, are formed so that when all are at the same temperature their values as electric resistances are equal. The other two legs of the bridge are constituted by resistances 20 and 21 which are respectively equal and which are preferably nearly equal in resistance to the other two legs of the bridge, although not necessarily so. Also, the resistances 20 and 21 should be kept at the same temperature and under the same conditions, and in order to do this they may be wound on the same spool or kept in the same bath of oil so that the electric resistance of 20 is equal to the electric resistance of 21. It will also be evident that when the calorimeter is not in operation and the resistances 10, 15, 11 and 19 are at the same temperature, the bridge will be balanced. This balance constitutes a check on the proper operation of the instrument. It will also be noted that when the temperature of resistance 15 minus the temperature of resistance 10 is equal to the temperature of resistance 19 minus the temperature of resistance 11, the bridge is balanced because the value of the electrical resistance of resistances 10, 15, 11 and 19 vary directly with absolute temperature.

From the foregoing it will be readily seen that if the difference in temperature produced by the burning fuel is different from the rise of temperature produced by the secondary source of heat, namely, the heater 16, the bridge will be thrown out of balance and the galvanometer 22 will swing one way or the other depending on which of the two differences is larger. It will be noted that a suitable source of power 23 must be provided for the bridge, as shown in Figure 2, said power being connected to the points 24 and 25 respectively. This current is, of course, small whereas the current to the heater 16 varies according to the heating needed.

In Figure 3 will be seen a diagram wherein the apparatus illustrated in Figure 1 is connected to automatic means whereby current is increased or decreased automatically in the heater until the difference in temperature between resistances 19 and 11 is equal to the difference in temperature between resistances 15 and 10. Referring to the diagram it will be noted that bridge 26 is the same as the bridge shown in Figure 2, but instead of having a galvanometer 22 wires 27 and 28 lead from points 29 and 30 to the windings of a polarized relay. This relay controls the magnetically operated switch 32, which switch is adapted to control the current supplied to the motor 33. It will be noted that switch 32 is supplied with current from the wires 34 and 35, which wires receive their current from the bus wires 36 and 37. Bus wire 36 extends to the contact arms 38 and 38' of the rheostat 39, while bus wire 37 extends to one terminal of the recording wattmeter 40, the opposite terminal of wattmeter 40 being connected through wire 41 to the contact post 42 of rheostat 39.

The arm 38 of the rheostat 39 is rigidly secured to a worm wheel 43 meshing continually with the worm 44. Worm 44 is secured rigidly to the armature of motor 33 whereby whenever this motor operates arm 38 will be swung. When the polarized relay 31 has been moved to one position arm 38 will move in one direction, and when the polarized relay is moved to the other position arm 38 will move in the opposite direction, whereby more or less current is turned on to the heater 16 according to the circumstances. It will also be noted that when the bridge is balanced the relay is in neutral position and the motor stops.

In the case of automatic operation the fuel is supplied to the burner 12 at a known and constant rate by means of a suitable device, as, for instance, a positive displacement pump kept at a constant temperature and driven at a constant speed. As the power input to the electric heater 16 is automatically adjusted until the temperature difference between resistances 19 and 11 is numerically equal to the temperature difference between resistances 15 and 10, then the reading of the wattmeter is a measure of the heating value of the fuel being tested. It is to be understood that the wattmeter scale can be calibrated to read heating value in any unit desired.

In Figure 4 a slightly modified form of that shown in Figure 3 has been disclosed. In this form the rheostat 39 and associated parts are identical with that shown in Figure 3, with the exception that arm 38 is provided with an extension 45 adapted to receive a stylus 46. A traveling strip of paper or other material 47 is arranged in the path of the stylus 46 and is adapted to be marked thereby. In this way a record may be made continually and automatically. When power is supplied to wires 37 and 36 at a constant potential, it is evident that the rheostat can be calibrated so that a certain displacement represents a given power input to the electric heating element of the calorimeter. The pen or stylus 46 on the arm 48 records directly on the paper or other moving element 47. In this way the recording wattmeter is not necessary. When operating the device, it is cause to function for some appreciable time before a test is taken in order that the action will be as uniform as possible. In operation, there may be some slight errors, but these are negligible and do not affect the reasonable accuracy of the device. For instance, the fuel supplied to the burner is at a lower temperature than the resistance 10 and, consequently, a certain amount of heat is to be expended for warming the incoming fuel to the temperature of resistance 10. This fact produces a small error but this error is negligible in most cases. However, this error may be entirely eliminated by preheating the incoming fuel to the temperature of resistance 10, but, as just stated, the error is so negligible that it does not materially affect the final result.

When bringing the instrument to a thermal balance a small lag exists between the time that you change the adjustment of the heating element and the time that resistance 19 gets heated up to the temperature of the flowing gas but this lag on starting has nothing to do with the accuracy obtained when the device is functioning properly. It will be noted that since the air and products of combustion are flowing at a steady rate, the weight flowing past the portion 13 is in a given time numerically equal to the weights respectively flowing past 14, 15, 9, 11, 16, 18 and 19. Now, if a given portion "A" passes between 10 and 15 and affects those resistances, it is not necessary to wait until the same portion "A" goes through the heat exchanger and finally comes to 11 and 19 because at the very same instant that the given portion "A" went past 13 and 15, another portion "B" of exactly the same weight went past 17 and 19.

What I claim is:

1. The method of determining the heat value of a fuel having an unknown heat value, which consists in burning the fuel in the presence of preheated air to produce heated gases, cooling said gases to substantially the original temperature of the preheated air, subjecting said cooled gases to heat from a second source, varying the heat from said second source until the rise of temperature of the gases at its second heating is substantially the same as the rise of temperature given to the heated gases by burning of the fuel, and then measuring the energy used in producing the heat of the second mentioned source.

2. The method of determining the heat value of a fuel, which consists in burning the fuel in the presence of air to produce heated gases, cooling said gases, subjecting said cooled gases to the heat from a second source, measuring the fuel applied to the burner in unit time, varying the energy supplied in said unit time to said second source by measured quantities, and then determining when the rise in temperature of the air produced by the fuel is equal to the rise in temperature of the gases produced by the second heat source.

3. A fuel calorimeter including means forming a continuous passageway from one point to another, means substantially central of said passageway presenting a heat exchange apparatus, said heat exchange apparatus having an outlet for heated gases and an outlet for cooled gases, a resistance arranged near each of said outlets, a burner using fuel of unknown heat value arranged in said passageway adjacent one of said outlets whereby the gaseous matter passing the burner will have the temperature thereof increased, a resistance arranged adjacent said burner and positioned to have its temperature increased by said heated gaseous matter, said heated gaseous matter passing through said heat exchange apparatus to the other of the first mentioned resistances, a second source of heat for heating said gaseous matter a second time, a fourth resistance adapted to thereafter be heated by said heated gaseous matter, means for regulating the heat of said second source of heat, means for measuring the fuel supplied to said burner in a unit time, and means for measuring the energy used in said unit time by said second source of heat.

4. A fuel calorimeter including a heat exchange apparatus having an air passageway therethrough, means for directing air into said passageway, a burner supplied with fuel of an unknown heat value, means for directing air from said passageway past said burner, means for directing the products of combustion from said burner through said heat exchange device, a heating member dissipating heat at a known rate, means for directing said products of combustion after passing through said heat exchange device to said heating member for re-heating said products of combustion, a pair of resistances arranged near said burner, the respective resistances being on opposite sides of the burner, a pair of identical resistances arranged near said heating member, the respective resistances of said last mentioned pair being on the opposite sides of said heating member so that the temperature of one resistance of each pair will be raised respectively by the heated air and products of combustion, said pairs of resistances being identical, means for varying the heat from the member dissipating heat at a known rate, means for measuring the amount of fuel supplied in unit time to the burner, means for measuring the energy used in unit time by the heating member dissipating the heat at a known rate, and means associated with both pairs of resistances forming a Wheatstone bridge for indicating when the differences in temperature between the members of the respective pairs of resistances are equal.

5. A calorimeter comprising a housing formed with a passageway therethrough having an air inlet and an air outlet, said passageway being formed into a primary heating section, a secondary heating section, a primary air inlet section discharging into said primary heating section, a secondary air inlet section discharging into said secondary heating section, and a heat exchange section having tubular means connecting the outlet of said primary heating section with the inlet of said secondary air inlet section, a burner at the inlet of said primary heating section, said burner being adapted to use a combustible of unknown heat value, a foraminous baffle arranged in said passageway immediately above said burner, a resistance positioned in said primary heating section on the opposite side of said baffle to said burner whereby its temperature will be raised by the flow of heated gases through said primary heating chamber, identically formed resistances arranged respectively substantially centrally of said primary air inlet section, and said secondary air inlet section, an electric heater positioned in the entrance of said secondary heating section, a foraminous baffle arranged immediately above said electric heater, a resistance positioned in said secondary heating section on the opposite side of the last mentioned baffle to said electric heater, the resistances in said primary and secondary heating sections, being identical, means for varying the current supplied to said electric heater, means for measuring the energy of the electricity supplied to said electric heater, and means for determining when the temperature difference between the resistances in said primary heating section is equal to the temperature difference between the resistances in said secondary heating section.

6. A calorimeter comprising a primary and a secondary heating chamber, a pair of identical resistance elements in each of said chambers, a heat exchanger positioned to heat and direct the heated air into said primary heating chamber and to receive the products of combustion from said heating chamber, cool the same and direct the cooled products of combustion to the secondary heating chamber, said heat exchanger causing the air entering the primary heating chamber and the products of combustion leaving the secondary heating chamber to be at approximately the same temperature, a heater formed as a burner for said primary heating chamber, said burner being adapted to use a combustible of an unknown heat value, a heater for said secondary heating chamber, said second mentioned heater dissipating heat at a known rate, means for varying the heat from said second mentioned heater, means for measuring the fuel supplied to said burner in unit time, means for measuring the energy supplied to said second mentioned heater in said unit time, said resistances in each chamber being respectively at opposite sides of the respective heaters and means for indicating when the temperature differences between said pairs of resistances are equal.

7. A calorimeter including primary and secondary heating chambers, a pair of identical resistance elements associated with each of said chambers, a heat exchanger positioned to heat and direct air into said primary heating chamber and to receive the products of combustion from said primary heating chamber, cool the products of combustion and direct the cooled products of combustion into said secondary heating chamber, said heat exchanger acting on the air and products of combustion so that the air entering the primary heating chamber will be at substantially the same temperature as the products of combustion entering the secondary heating chamber, a burner for said primary heating chamber for heating the air supplied thereto, said burner being adapted to use a combustible of unknown heat value, a heater for said secondary heating chamber for heating the products of combustion supplied thereto, said heater dissipating heat energy at a known rate, means for varying the supply of energy to said heater to vary the temperature in the secondary heating chamber, the resistances in the primary chamber being on opposite sides of said burner and the resistances in the secondary chamber being on opposite sides of said heater and means for determining when the difference in temperature between the resistances in said primary heating chamber is equal to the difference in temperature between the resistances in said secondary heating chamber.

8. A calorimeter including primary and secondary heating chambers, a heat exchanger positioned to heat the air entering said primary heating chamber and cool the gases leaving the primary heating chamber, said heat exchanger directing said gases into said secondary heating chamber, said heat exchanger causing the air entering the primary heating chamber to be at substantially the same temperature as the gases entering the secondary heating chamber, an entrance resistance element positioned at the entrance to each of said heating chambers, said elements being identical and positioned to have their temperatures varied by the air or other gases entering said chambers, identical resistances positioned in each of said heating chambers, a burner adapted to use a combustible of unknown heat value positioned to heat the air as it passes through the primary heating chamber, a heater using energy at a known rate positioned to heat the gases passing through said secondary heating chamber, means for varying the energy supplied to said heater, said resistances in said heating chamber, said entrance resistances and two auxiliary resistances being connected to form a balanced electric circuit responsive to changes in the rise of temperature of the gases flowing through either the primary or secondary heating chambers, means for registering the rate of supply of energy to said heater so that when the burner is supplied with fuel at a known and constant rate, the record of the power supply to the heater is a measure of the heating value of the fuel being consumed in the burner at the time of registering.

9. A calorimeter including a primary heating chamber provided with a primary air entrance section, a secondary heating chamber provided with a products of combustion entrance section, a heat exchanger positioned to heat the air entering said primary air entrance section and cool the products of combustion flowing from said primary heating chamber to said products of combustion entrance chamber, said heat exchanger causing the air entering the air entrance section and the products of combustion entering the products of combustion entrance section to be of substantially the same temperature, identical resistance coils in each of said sections, identical resistance coils positioned in each of said chambers, a burner adapted to use a combustible of unknown heat value, said burner being positioned to direct all of its heat into said primary chamber, whereby the temperature of the air and resistance in the primary chamber will be raised, a heater dissipating heat at a known rate positioned so that all the heat therefrom will be directed into said secondary heating chamber for raising the temperature of the air and products of combustion and resistance therein, means for connecting the resistance coil in said primary heating chamber in series with the resistance coil in said primary entrance section, means for connecting in series the other two resistance coils, and means including an electric circuit for balancing the resistance of one pair of said resistance coils against the other to determine when the temperature differences between the respective pairs of coils are equal.

10. A calorimeter including a primary heating chamber provided with an air entrance section, a secondary heating chamber provided with an air and products of combustion entrance section, a heat exchanger positioned to heat and direct air into said primary air entrance section and receive air and products of combustion from said primary heating chamber, cool the same and then direct the same into said air and products of combustion entrance section, said heat exchanger causing the air entering said primary air entrance section and the air and products of combustion entering the air and products of combustion entrance section to be at substantially the same temperature, a resistance coil arranged in each of said sections, said coils being identical, a resistance coil positioned in each of said chambers, said coils being identical, a burner using a fuel having an unknown heat value positioned to heat the air passing through said primary heating chamber, a heater using an energy at a known rate positioned to heat the air and products of combustion passing through the secondary heating chamber, means for connecting in series the coils in said primary entrance section and said primary heating chamber, means for connecting the other two coils in series, means forming a balanced circuit with each pair of coils acting as a leg of said circuit, and means controlled by a difference in resistance of said pairs of coils for regulating the energy supplied to said heater.

11. A calorimeter including a primary heating chamber provided with an air entrance section, a secondary heating chamber provided with a products of combustion entrance section, means connecting said air entrance section to said products of combustion entrance section, said means including a heat exchanger positioned to heat and direct air into said air entrance section and receive products of combustion from said primary heating chamber, cool the same, and direct the cooled products of combustion into said secondary heating chamber, said heat exchanger acting to cause the air to enter said air entrance section at substantially the same temperature that the products of combustion enter the products of combustion entrance section, a resistance coil arranged in each of said sections, said coils being identical, a resistance coil arranged in each of said chambers, said last mentioned coils being identical, a burner using a fuel of unknown heat value for heating the air in said primary heating chamber, whereby the coil in said primary heating chamber will have its temperature raised, a heater using an energy at a known rate positioned to heat the products of combustion in said secondary heating chamber whereby the temperature of the resistance coil in said secondary heating chamber will be raised, means for connecting said resistances in pairs so that the resistance coil of the primary heating chamber will be in series with the resistance coil in the air entrance section, and the other resistance coils will be in series, means for forming a balanced circuit of the Wheatstone bridge type, said means using the respective pairs of coils as two legs of the bridge, means for supplying current to said balanced circuit, a polarized relay connected to the center of said balanced circuit whereby when said balanced circuit is out of balance said polarized relay will be moved accordingly, and means controlled by said polarized relay for supplying more or less energy to said heater according to the direction in which said polarized relay has been moved.

12. A calorimeter including a primary heating chamber provided with a primary air entrance section, a secondary heating chamber provided with a products of combustion entrance section, a heat exchanger positioned to heat and direct the heated air into said primary air entrance section and to receive the products of combustion from said primary heating chamber, cool the same and direct the cooled products of combustion into said products of combustion entrance section at substantially the same temperature as the air entering said air entrance section, an entrance resistance coil positioned in each of said sections, said entrance resistance coils being identical, a testing resistance coil positioned in each of said chambers, said testing resistance coils being identical, a burner for using combustible of unknown heat value, said burner being positioned to direct all of its heat into said primary chamber whereby the temperature of the coil therein will be raised, an electric heater for heating the air and products of combustion in said secondary heating chamber, a rheostat means including an arm for controlling the current supplied to said electric heater, means for recording and indicating the current used in said electric heater, a balanced circuit including all of said coils, the testing coils being in companion legs of the circuit and one of the entrance coils in each of said companion legs, means for supplying current to said balanced circuit, a polarized relay connected to the points where the legs of the balanced circuit are connected, a magnetically operated switch controlled by said relay, and a motor means connected with said switch, said motor means being operatively connected with said rheostat for moving the arm thereof back and forth according to the way in which said polarized relay acts, whereby more or less current is supplied to said electric heater.

13. A calorimeter including a balanced circuit of the Wheatstone bridge type, the circuit having two legs formed with identical resistances, each leg comprising primary and auxiliary resistances in series, a primary heating chamber surrounding one of the primary resistances, an auxiliary heating chamber surrounding the other primary resistance, a heat exchanger positioned to heat air and direct the heated air into contact with one of said auxiliary resistances for heating the same, said heated air passing into said primary heating chamber, said heat exchanger being also in a position to receive, cool, and direct the products of combustion from said primary heating chamber into contact with the other of said auxiliary resistances for heating the same, said products of combustion flowing from said other auxiliary resistance to said auxiliary heating chamber, said heat exchanger acting to cause the air entering the primary heating chamber to be at substantially the same temperature as the products of combustion entering the auxiliary heating chamber, a burner using a fuel of unknown heat value for heating the air entering said primary heating chamber, the products of combustion from said burner acting to heat the primary resistance in one of said legs, a heater dissipating heat at a known rate for heating the products of combustion in said auxiliary chamber, said heated products of combustion heating the other primary resistance, and means for varying the heat produced by said heater.

14. A calorimeter including means forming a heat exchange apparatus having a passageway for cool air and a passageway for heated air, means for directing cool air through the first passageway, tubular means for directing said air after it has passed through the first passageway to the second passageway, tubular means for directing said air after it has passed through the second passageway to a discharge point, a heater using fuel of an unknown heat value positioned to heat the air as it passes through the first tubular means, a heater having a known heat value which may be regulated, said last mentioned heater being positioned to heat said air as it passes through the second tubular means, a primary resistance positioned in the outlet end of said first passageway, a second primary resistance positioned in the outlet end of said second passageway, said resistances being identical, a secondary resistance positioned in the first tubular means between the first mentioned heater and said second passageway, an auxiliary secondary resistance positioned in the second tubular means between the second mentioned heater and said discharge point, said secondary resistances being identical, means for varying the heat from the heater dissipating heat at a known rate, means comprising an electric circuit including all of said resistances and forming a Wheatstone bridge with the primary resistance in the outlet of the first passageway and the secondary resistance in the first tubular means in one leg of the bridge and the other two resistances in the other leg of the bridge for indicating when the difference in temperature is equal.

15. The method for continuously determining the heating value of a combustible comprising the burning of the combustible at a definite volumetric rate in a stream of gaseous working fluid, measuring the rise of temperature in the working fluid due to said burning, thereafter heating the same fluid stream by a supplementary measurable heating source at a measured rate of heat input that is kept substantially equalized with respect to the aforesaid temperature rise, said steps being performed in successive stages of which the initial temperature rise of the first stage is substantially equal to the final temperature rise in the other stage, the heat input of the second stage being employed as an index of the calorific value of the combustible of the first stage.

16. The method for continuously determining the heating value of a combustible and which method consists in the following successive steps, viz: firstly, providing for a gaseous working fluid containing an oxidizing agent and establishing a flow of such fluid; secondly, burning the combustible at a predetermined rate to initiate a measurable temperature rise in a localized portion of such fluid stream; thirdly, cooling said stream portion to substantially reestablish its original temperature; and thereupon subjecting the cooled stream portion to a measured independent heat source until the temperature rise thereby imparted shall maintain said stream portion in a thermally balanced relation with respect to the aforesaid initiated temperature rise.

RAFAEL WILLIAM KEITH.